United States Patent [19]
Heiler

[11] Patent Number: 5,879,059
[45] Date of Patent: Mar. 9, 1999

[54] MOTOR VEHICLE WHEEL

[75] Inventor: Roland Heiler, Tiefenbronn, Germany

[73] Assignee: Dr. Ing. h.c.F. Porsche AG, Weissach, Germany

[21] Appl. No.: 824,965

[22] Filed: Mar. 27, 1997

[30] Foreign Application Priority Data

Mar. 27, 1996 [DE] Germany .................. 196 12 115.9

[51] Int. Cl.⁶ ................................................ B60B 3/10
[52] U.S. Cl. ...................... 301/65; 301/64.1; D12/204; D12/211
[58] Field of Search ................... 301/63.1, 64.1, 301/65, 104, 64.7; D12/204, 209, 211

[56] References Cited

U.S. PATENT DOCUMENTS

D. 292,506  10/1987  McKeon ................................ D12/211
783,034  2/1905  Gerling ................................ 301/65 X
1,635,490  7/1927  Meldrum ................................ 301/65
4,118,073  10/1978  Marwitz ................................ 301/65 X

FOREIGN PATENT DOCUMENTS

M 95 03 760  1/1996  Germany .

OTHER PUBLICATIONS

Leue, Andreas: Gutes Rad. In: Auto 1994, Nr. 22, pp. 50–52.

*Primary Examiner*—Russell D. Stormer
*Attorney, Agent, or Firm*—Evenson, McKeown, Edwards & Lenahan, P.L.L.C.

[57] ABSTRACT

A wheel for a motor vehicle has a wheel spider with spokes defining large air openings therebetween. The spokes extend approximately radially from the wheel hub to the wheel rim. Each spoke comprises at least two outer ribs that extend approximately parallel to one another. At least two inner ribs extend diagonally between the spokes. The inner ribs connect the outer ribs with one another and intersect each other.

24 Claims, 1 Drawing Sheet

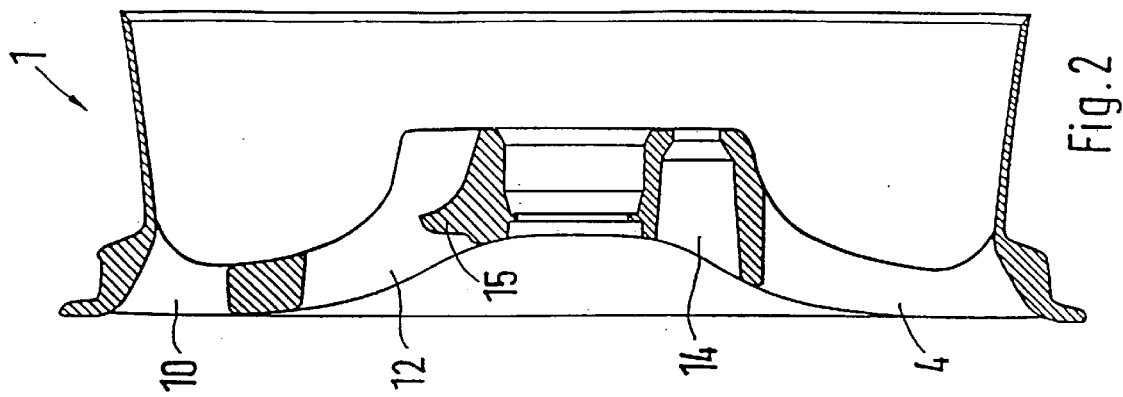
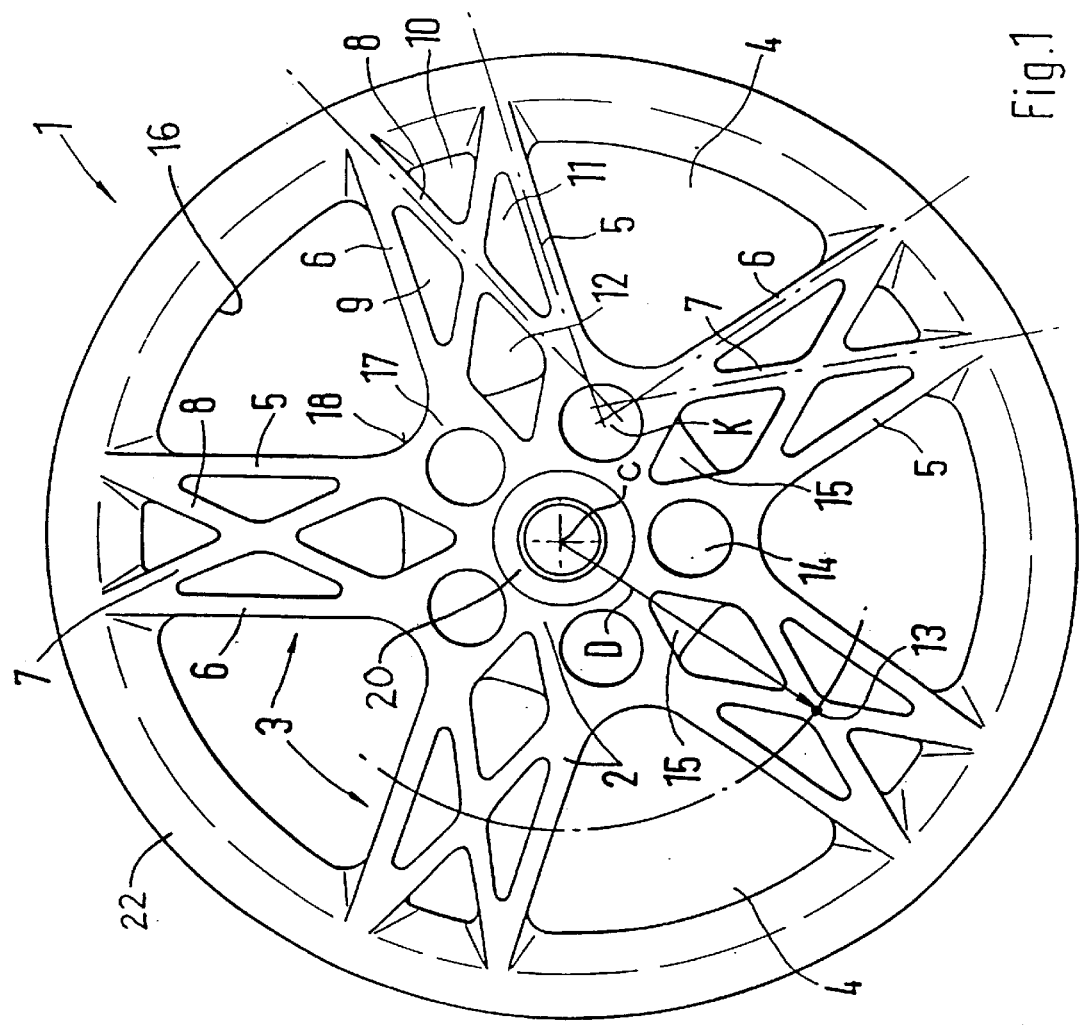

MOTOR VEHICLE WHEEL

BACKGROUND AND SUMMARY OF THE INVENTION

The invention relates to a wheel for a motor vehicle, and more particularly to a wheel having a plurality of spokes defining relatively large air openings therebetween, each of the spokes comprising of ribs extending essentially radially from the wheel hub to the wheel rim.

This application claims the priority of German Patent Application No. 196 12 115.9 filed on Mar. 27, 1996 in Germany, the disclosure of which is expressly incorporated by reference herein.

A wheel for a motor vehicle is known from German Design Patent M 95 03 760, said wheel having spokes between air openings, said spokes each consisting of two outer ribs running radially and extending from the rim flange to the wheel hub, with a continuous elongate air opening provided between the outer ribs.

A goal of the invention is to provide a wheel for a motor vehicle having a wheel spider which provides optimum air throughput and guarantees high strength.

These and other goals have been achieved according to the present invention by providing a wheel for a motor vehicle including a wheel spider having a plurality of spokes extending radially between a wheel hub and a wheel rim, adjacent ones of the spokes and the wheel rim defining air openings therebetween, each of the spokes comprising: at least two outer ribs which extend approximately parallel to each other between the wheel hub and the wheel rim; and at least two inner ribs extending diagonally between the outer ribs, the inner ribs intersecting each other.

These and other goals have also been achieved according to the present invention by providing a mold for a wheel for a motor vehicle, the mold comprising mold openings for receiving a material for forming the wheel, the mold openings defining a wheel hub, a wheel rim, and a plurality of spokes extending radially between the wheel hub and the wheel rim, the mold openings which define each of the spokes including mold openings which define: at least two outer ribs which extend approximately parallel to each other between the wheel hub and the wheel rim; and at least two inner ribs extending diagonally between the outer ribs, the inner ribs intersecting each other.

One advantageous feature achieved by the present invention results from the construction of the wheel spider with a plurality of spokes that join to form a lattice-like composite structure for strength. For this purpose, inner ribs are provided which run diagonally between the outer ribs of each spoke, said inner ribs intersecting with one another. The inner ribs intersect each other in an area between the wheel center point and the wheel rim, for example between 30% and 70% of the radial distance between the wheel center point and the wheel rim, and more preferably between 50% and 70% of the radial distance between the wheel center point and the wheel rim. In one preferred embodiment, five spokes are provided, which achieves a particularly strong wheel structure.

The filigree (i.e., lattice-like) design of the individual spokes with additional internal air openings in each spoke between the outer ribs and the internal ribs advantageously achieves a stable wheel with great strength, especially high torsional stiffness. This is accomplished in particular since the outer ribs of adjacent spokes which are directly opposite each other in a circumferential direction (i.e., the outer ribs of adjacent spokes which define one of the relatively large air openings in the wheel), as well as one diagonal inner rib of each spoke, meet at a node proxima a hole for a mounting bolt. In one preferred embodiment, four internal air openings are provided in each spoke, which achieves a particularly strong wheel structure.

In addition to the relatively large air opening between the individual ribs, smaller air openings are provided within the spokes that are made roughly polygonal, e.g. triangular. The diagonal position of the inner ribs means that in each case two air openings of approximately the same size are located opposite one another with respect to the intersection point between the inner ribs.

The relatively large air openings defined between adjacent spokes of the wheel are essentially triangular and have at their radially outer periphery with respect to the wheel hub an external curved shape determined by the wheel rim. The relatively large air openings are rounded at the vertices of the outer ribs of adjacent spokes, with these rounded areas being located opposite the holes for the mounting bolts, respectively.

Other objects, advantages and novel features of the present invention will become apparent from the following detailed description of the invention when considered in conjunction with the accompanying drawings.

BRIEF DESCRIPTION OF THE DRAWINGS

FIG. 1 is a front view of a wheel according to a preferred embodiment of the present invention having spokes consisting of inner ribs and outer ribs; and FIG. 2 is a section through the wheel of FIG. 1.

DETAILED DESCRIPTION OF THE DRAWINGS

Referring to FIGS. 1 and 2, wheel 1 comprises a plurality of spokes 3 in the configuration of a wheel spider 2. The spokes 3 extend generally radially between the wheel hub 20 and the wheel rim 22, and define large air openings 4 (first air openings) therebetween. Each spoke 3 consists essentially of two outer ribs 5, 6 located approximately parallel to one another, and inner ribs 7, 8 extending diagonally between the outer ribs. The inner ribs 7, 8 are arranged so that they intersect to form triangular air openings 9, 10, 11, and 12 (second air openings) between themselves and the outer ribs 5, 6. An intersection 13 of inner ribs 7, 8 is located between the wheel hub 20 and the wheel rim 22 at a radial distance D from the wheel center point C. In the illustrated embodiment, the distance D is approximately 60% of the distance between the wheel center point C and the wheel rim. However, the distance D may be appropriately varied and selected by a person of ordinary skill in the art based on individual design criteria.

Extensions of the midlines of directly opposite outer ribs 5 and 6 of adjacent spokes 3 (i.e., the outer ribs 5 and 6 that enclose the large air openings 4 between them), as well as respective diagonally-extending inner ribs 8 and 7 of said adjacent spokes 3, meet approximately in the vicinity of the holes 14 for the wheel mounting bolts located between said adjacent spokes at the wheel hub 20, as shown in dot-dash lines in FIG. 1.

Of the four smaller air openings 9, 10, 11, and 12 in each spoke 3, two air openings 9, 11 and 10, 12, respectively, are located opposite one another with respect to the intersection point 13 of the inner ribs 7, 8. These air openings are triangular in shape, with openings 9 and 11 having larger air throughputs than the other two air openings 10 and 12.

Inner air opening 12 has a diamond-shaped peripheral boundary edge when viewed as a whole, with the area located between the wheel mounting bolt holes 14 having a closed recessed area 15 to increase strength at the wheel hub. Triangular air opening 12 is located adjacent to this area 15.

The large air openings 4 between adjacent spokes 3 have an outer curve 16 formed by the shape of the wheel rim, which curve 16 is abutted by outer ribs 5, 6 of adjacent spokes 3. The large air openings 4 are defined at vertices 17 of the outer ribs 5, 6 of adjacent spokes 3 by a rounded area 18, which is immediately opposite the respective wheel mounting bolt hole 14 located between said adjacent spokes 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A wheel for a motor vehicle including a wheel spider having a plurality of spokes extending radially between a wheel hub and a wheel rim, adjacent ones of said spokes and said wheel rim defining a first air opening therebetween, each of said spokes comprising:
    at least two outer ribs which extend approximately parallel to each other between said wheel hub and said wheel rim; and
    at least two inner ribs extending diagonally between said outer ribs, said inner ribs intersecting each other, said inner ribs and said outer ribs defining a plurality of second air openings extending through said spokes.

2. A wheel according to claim 1, wherein said second air openings are polygonal.

3. A wheel according to claim 2, wherein said second air openings are located opposite each other in pairs with respect to an intersection point between said inner ribs.

4. A wheel according to claim 1, further comprising a plurality of wheel bolt holes located at the wheel hub, wherein extensions of midlines of opposite outer ribs of adjacent ones of said spokes intersect proximate one of the wheel bolt holes located at the wheel hub, and wherein extensions of midlines of said inner ribs of said adjacent ones of said spokes intersect proximate said one of the wheel bolt holes.

5. A wheel according to claim 2, further comprising a plurality of wheel bolt holes located at the wheel hub, wherein extensions of midlines of opposite outer ribs of adjacent ones of said spokes intersect proximate one of the wheel bolt holes located at the wheel hub, and wherein extensions of midlines of said inner ribs of said adjacent ones of said spokes intersect proximate said one of the wheel bolt holes.

6. A wheel according to claim 2, wherein in each of said spokes, said inner ribs and said outer ribs define at least four of said second air openings, and wherein each of said second air openings has a triangular shape.

7. A wheel according to claim 3, wherein in each of said spokes, said inner ribs and said outer ribs define at least four of said second air openings, and wherein each of said second air openings has a triangular shape.

8. A wheel according to claim 2, further comprising a plurality of wheel mounting bolt holes located at the wheel hub, wherein one of said second air openings is located proximate a pair of said wheel mounting bolt holes, a recessed area extending from said one of said second air openings into an area between said pair of said wheel mounting bolt holes, said one of said second air openings and said recessed area each being triangular and having one common side such that said one of said air openings and said recessed area form a diamond-shaped periphery.

9. A wheel according to claim 2, further comprising a plurality of wheel mounting bolt holes located at the wheel hub, said outer ribs of adjacent ones of said spokes being connected by a rounded area proximate one of said wheel mounting bolt holes, said second air openings being generally triangular and being defined by a curved outer boundary at the wheel rim, by said rounded area, and by said adjacent ones of said spokes.

10. A wheel according to claim 1, wherein said inner ribs intersect each other between said wheel hub and said wheel rim.

11. A wheel according to claim 1, wherein each of said at least two inner ribs connects said outer ribs.

12. A wheel according to claim 1, wherein said at least two inner ribs consist of exactly two inner ribs arranged essentially in an X-shaped configuration.

13. A wheel according to claim 12, wherein said two inner ribs and said outer ribs define exactly four of said second air openings.

14. A wheel according to claim 13, wherein said wheel defines a center and has a radius, said two inner ribs intersecting each other at a point located at a distance of approximately one-half of said radius from said center.

15. A wheel according to claim 1, wherein said second air openings are relatively small compared to said first air opening.

16. A wheel, comprising:
    a wheel hub;
    a wheel rim;
    a plurality of spokes extending between said wheel hub and said wheel rim, adjacent ones of said spokes and said wheel rim defining a first air opening therebetween, each of said spokes including two outer ribs and at least two inner ribs, said outer ribs extending between said wheel hub and said wheel rim, each of said at least two inner ribs extending diagonally between said outer ribs and connecting said outer ribs, said at least two inner ribs intersecting each other.

17. A wheel according to claim 16, wherein said inner ribs and said outer ribs defining a plurality of second air openings extending through said spokes.

18. A wheel according to claim 17, wherein said at least two inner ribs consist of exactly two inner ribs arranged essentially in an X-shaped configuration.

19. A wheel according to claim 18, wherein said two inner ribs and said outer ribs define exactly four of said second air openings.

20. A wheel according to claim 17, wherein said second air openings are relatively small compared to said first air opening.

21. A wheel according to claim 17, wherein said second air openings are triangular.

22. A wheel according to claim 16, wherein said at least two inner ribs consist of exactly two inner ribs arranged essentially in an X-shaped configuration.

23. A wheel according to claim 22, wherein said wheel defines a center and has a radius, said two inner ribs intersecting each other at a point located at a distance of approximately one-half of said radius from said center.

24. A wheel according to claim 16, wherein said two outer ribs are parallel to each other.

* * * * *